May 5, 1936.     P. H. DIXON     2,039,584
DRAWING INSTRUMENT
Filed Jan. 8, 1934
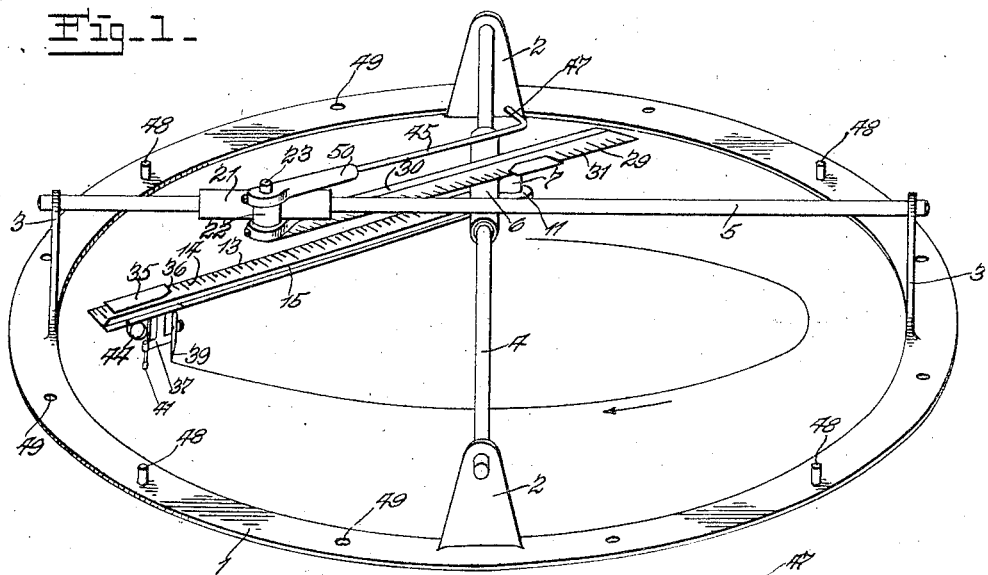
Inventor
Paul H. Dixon
by Rippey + Kingsland
His Attorneys Patented May 5, 1936

2,039,584

UNITED STATES PATENT OFFICE 2,039,584

DRAWING INSTRUMENT

Paul H. Dixon, Springfield, Ill.

Application January 8, 1934, Serial No. 705,661

12 Claims. (Cl. 33—31)

This invention relates to drawing instruments, and has special reference to ellipsographs.

Objects of the invention are to provide a drawing instrument that is of light weight and sturdy construction and capable of use to draw ellipses of any desired shape or to draw circles; to provide an instrument that may be used to draw a perfect circle and also to draw that circle as it appears in ellipse viewed from any angle down to within about five degrees of its horizon; to provide an instrument that will draw ellipses as small as it has been found necessary to illustrate them; to provide an instrument that will draw ellipses of any desired shape at a single setting of the device and one stroke of the pen; to provide an instrument of the character mentioned having a removable centering member by which the device may be accurately and precisely located on the drawing board; to provide means in connection with the instrument whereby it may be secured to and properly located on the drawing board; to provide an instrument having bearings equipped with means for automatically taking up any play caused by wear; to provide an instrument with a pair of reading scales clearly legible and visible to facilitate the setting and adjustment of the instrument to draw ellipses of any desired shapes and sizes; to provide improved means for adjusting the pen vertically and for resiliently pressing the pen against the drawing paper; to provide means for supporting the pen out of contact with the drawing paper; to provide means for preventing the pen from cutting into or scratching against the surface of the paper without interfering with the effective operation of the pen; and to provide an ellipsograph capable of a wider range of work and which is easier to operate than devices heretofore provided for such purposes.

Other objects and advantages of the invention will be apparent from the following description, reference being made to the annexed drawing, in which—

Fig. 1 is a perspective view of the instrument in operation.

Fig. 2 is an enlarged perspective view of the pen and its associated parts detached from the scale.

Fig. 3 is an enlarged side elevation of the moving parts centered for operation about the same axis.

Fig. 4 is a perspective view of one of the washers included in the invention.

Fig. 5 is an enlarged top plan view showing a part of one of the quick reading scales with its securing and sliding members.

Fig. 6 is an enlarged top view of the eccentric scale clamp and its clamping collar.

In the embodiment chosen for illustration, the device comprises an open frame member 1 having rigid therewith two upstanding posts 2 and also having rigid therewith two additional posts 3 extending to a greater height than the posts 2. A rod 4 is rigidly supported by the posts 2 and a similar rod 5 is rigidly supported by the posts 3 at right angles to and some distance above the rod 4. Each of said rods is approximately midway of the ends of the other rod.

A sleeve 6 is mounted for sliding movements along the rod 4 and is rigid with a laterally extended bearing arm 7. A hollow spindle 8 is mounted for turning movements in the bearing arm 7 and projects beyond the upper and lower surfaces of said bearing arm. A conical split washer 9 of indurated fiber, or other appropriate material, is mounted on each end of the spindle 8, the tapered portions of said washers extending into similarly shaped recesses in the upper and lower sides of the bearing arm 7. An elastic washer 10 of rubber, or similar material, is mounted below the lower washer 9.

A socket 11 is mounted on the lower end of the spindle 8 and rigidly attached thereto by a clamping set screw 12. An angular quick reading scale 13 is rigid with the socket 11 and has on its upper surface designated graduations 14 and along one edge an upwardly extending strengthening rib or flange 15. A socket 16 is mounted on the upper end of the spindle 8 and is rigidly attached thereto by a clamping set screw 17. When the parts are assembled the sockets 11 and 16 are pressed toward each other in clamping engagement with the adjacent parts and are then rigidly attached to the spindle 8 by means of the set screws 12 and 17. A guide bracket 18 is rigid with the socket 16 and has inwardly extended marginal portions 19 and 20.

A sleeve 21, similar to the sleeve 6, is mounted for sliding movements on the rod 5 and has a laterally extended bearing arm 22. A tubular spindle 23 extends through the bearing arm 22 and beyond the upper and lower surfaces thereof and a washer 9 is mounted on each end of said spindle, the tapered portions of said washers extending into similarly shaped recesses in the upper and lower sides of the arm 22. A socket 24 is mounted on the lower arm of the spindle 23 and rigidly attached thereto by a set screw 25. An arm 26, constituting a handle, is attached to the upper end of the spindle 23 by a clamping set screw 27. A rubber or other elastic washer 28 is mounted between the handle 26 and the washer 9. In assembling these parts the socket 24 and the handle 26 are placed on the spindle 23 and pressed toward each other and rigidly attached to said spindle by the set screws 25 and 27, respectively. The rubber washers 10 and 28 function to press the washers 9 into their counter-sunk recesses and thereby constantly maintain the parts in closely assembled relationship.

An eccentric control scale member 29 has adjacent one marginal edge thereof an upstanding strengthening flange or rib 30 and has one end rigidly attached to the socket 24. This scale member 29 extends over the guide bracket 18 and is engaged by the inturned marginal portions 19 and 20 thereof. This guide bracket, comprising the parts 18, 19, and 20, frictionally and clampingly engages the eccentric scale member 29, the parts 19 and 20 being resilient for this purpose. By means of this clamping member the eccentric scale member 29 will be held in fixed relationship to the pen supporting scale member 13 but may be moved in order to permit any desired relative adjustment of these scale members, which involves also a relative movement of the sleeves 6 and 21 along the rods 4 and 5. This is to say that the sleeves 6 and 21 may be moved relatively from a position in which the axes of the tubular spindles 8 and 23 are in vertical alinement to any desired relative positions. A graduated scale 31 is formed on the upper surface of the scale member 29 so as to guide the operator in making adjustments of the scale members with respect to each other. The end 32 of the part 20 constitutes a gage to be observed in connection with the graduations 31 in making the adjustments of the scale members in respect to each other.

The pen scale clamp comprises a plate 33 having resilient inturned marginal portions 34 and 35 clampingly engaging the marginal portions of the scale member 13 with sufficient frictional pressure to prevent accidental or undesirable movement of the pen scale clamp along the scale member 13 but to permit manual movement thereof. The end 36 of the part 35 constitutes a gage to be read in connection with the graduation scale 14 in adjusting the pen scale clamp along the scale member 13. The part 33 of the pen scale clamp has rigid therewith a depending arm 37 on which a socket 38 is mounted for vertical sliding movements. A pen 39, which, as shown, is of conventional construction, is attached to the socket 38 and is designed and intended to operate along the paper on which the circular or elliptical outlines are to be drawn. A supporting rod 40 having a rounded head 41 at its lower end is frictionally mounted in a socket 42 formed in connection with the socket 38 and is designed and intended to operate along and against the surface of the paper to prevent the pen 39 from cutting into or scratching the paper undesirably. A resilient spring latch 43 is attached to the socket 38 and is engageable with the inturned marginal portion 35 in order to support the pen 39 above and out of contact with the paper. The spring latch 43 is releasable from the part 35 in order to permit the pen to move downwardly against the paper when circular or elliptical outlines are to be drawn. A spring 44 has one end attached to the under side of the part 33 and the opposite end engaging the socket 38 and the power and resiliency of said spring are utilized to press the pen against the paper.

A centering member 45 has at one end a point 46 and at the opposite end a lateral extension 47. This centering member may be extended through the vertically alined spindles 8 and 23 and the point 46 may be engaged with or into the paper in order to locate the device centrally. When so located the pen 39 may be moved to draw a complete and perfect circle about the axis of the member 45. The frame member 1 has a number of upwardly extended projections 48 which may be engaged with a T-square, or other suitable device, in order to locate the instrument properly. Also the frame member 1 has a number of holes 49 through which thumb tacks, or other fasteners, may be extended and engaged in the drawing board to hold the instrument in stationary position on the paper. The member 45 may be removed from the spindles 8 and 23 and the pointed end of said member may be extended into an appropriately shaped hole 50 in the handle 26, and said member may be used as an extension of the handle to operate the device.

When the sleeves 6 and 21 are moved relatively, the pen scale 13 and the eccentric scale 29 are relatively adjusted, the spindles 8 and 23 thereby being moved to disalinement. Then, when the handle 26 is rotated, it will rotate the spindle 23 and thereby the eccentric scale member 29 and the pen scale member 13, causing the pen 39 to draw an ellipse of any desired size within the capacity of the instrument and within the open frame member 1. The instrument illustrated will draw ellipses of varying sizes, which represent circles viewed from different points above their horizons.

The operation and use of this instrument should now be apparent to those familiar with such instruments and it is apparent that the construction and arrangement of the parts may be varied as widely as the scope of equivalents will permit without sacrifice of efficiency or function. Without restricting myself beyond these limits, I claim:

1. A drawing instrument comprising two relatively rigid rods supported in planes at right angles to each other and each extending substantially beyond both sides of the other, a sleeve mounted for longitudinal sliding movements along each of said rods to either side of the other rod, a vertical rotary element supported by each of said sleeves, a device for connecting and holding said rotary elements spaced apart and for rotating one of said elements by the other irrespective of the spacing of said elements, a vertical pivot device for engaging both of said sleeves and holding said sleeves from relative movement, means for rotating one of said elements and thereby rotating the other by said device, and a marker connected with and operated by said other element.

2. A drawing instrument comprising two relatively rigid rods supported in planes at right angles to each other and each extending substantially beyond both sides of the other, a sleeve mounted for longitudinal sliding movements along each of said rods and across and from one side to the other side of the plane of the other rod, a vertical rotary element supported by each of said sleeves, a device for connecting and holding said rotary elements spaced apart and for rotating one of said elements by the other irrespective of the spacing of said elements, means for rotating one of said elements and thereby rotating the other by said device and simultaneously sliding said sleeves along said rods as aforesaid, a pivot for engaging both of said members and holding them from relative lateral movement, and a marker connected with and operated by that element which is rotated by said device.

3. A drawing instrument comprising two relatively rigid rods supported in planes at right angles to each other, a sleeve mounted for longitudinal sliding movements along each of said rods across the plane of the other rod, a vertical rotary element supported by each of said rods, a pivot member for holding said elements in vertical alinement, a connection for rotating one of said elements, means for rotating the other element by said one element, and a marker connected with and operated by said other element.

4. A drawing instrument comprising a frame adapted to seat upon the material on which the drawing is to be formed and having an opening therein, a pair of rods supported by and above said frame and extending horizontally across the opening at right angles one above the other and each being approximately midway of the sides of the frame, parts projecting upwardly from said frame for engaging a locating instrument, and mechanism supported by said rods for forming ellipses within said opening.

5. A drawing instrument for forming ellipses comprising a frame having an opening, pairs of upwardly extended brackets rigid with approximately diametrically opposite sides of said frame and the brackets of each pair being spaced approximately ninety degrees from the brackets of the other pair, a rod supported by each pair of brackets one above the other, and mechanism slidably supported by said rods for drawing ellipses within said opening in said frame.

6. A drawing instrument comprising an open frame adapted to rest upon the paper upon which the drawing is to be formed, parts on said frame for engaging a locating instrument, rods supported at right angles to and one above the other above said frame and approximately midway of the sides of the frame, operating mechanism supported by said rods, a drawing instrument connected with a part of said operating mechanism, and means for holding said drawing instrument on the paper.

7. In a drawing instrument, an open frame, parts on said frame for engaging and cooperating with a locating instrument, two rods supported at right angles to each other above said frame and each extending diametrically across the frame, slides mounted on said rods, means for operating one of said slides by the other and thereby moving said slides along said rods and one above the other, and a drawing instrument connected with one of said slides.

8. In a drawing instrument, an open frame, two rods supported at right angles to each other above said frame and each extending diametrically across the frame, slides mounted on said rods, means for operating one of said slides by the other and thereby moving said slides along said rods and one above the other, a drawing instrument connected with one of said slides, and a removable centering member adapted to pivotally engage both of said slides and to engage the work upon which the instrument is mounted.

9. A drawing instrument comprising a frame, two relatively rigid rods supported by said frame at right angles to each other and each extending substantially beyond both sides of the other, a sleeve mounted for longitudinally sliding movements along each of said rods and across and from one side to the other side of the plane of the other rod, a vertical rotary spindle supported by each of said sleeves, a device connecting said spindles and holding said sleeves spaced apart and rotating one of said spindles by the other, means for rotating one of said spindles and thereby rotating the other by said device and sliding said sleeves along said rods as aforesaid, and an element for engaging both of said spindles and holding them in vertical alinement.

10. A drawing instrument for forming ellipses comprising a frame having an opening, pairs of upwardly extended brackets rigid with approximately diametrically opposite sides of said frame and the brackets of each pair being spaced approximately ninety degrees from the brackets of the other pair, a rod supported by each pair of brackets one above the other, mechanism slidably supported by said rods for drawing ellipses within said opening in said frame, and means controlling said mechanism to draw ellipses of different sizes.

11. A drawing instrument for forming ellipses comprising a frame having an opening, pairs of upwardly extended brackets rigid with approximately diametrically opposite sides of said frame and the brackets of each pair being spaced approximately ninety degrees from the brackets of the other pair, a rod supported by each pair of brackets one above the other, mechanism slidably supported by said rods for drawing ellipses within said opening in said frame, and means controlling said mechanism to draw circles.

12. A drawing instrument comprising an open frame, rods supported at right angles to one another above said frame, sleeves mounted on said rods for sliding movements thereon, a device for connecting and moving said sleeves along said rods, an arm extending from one of said sleeves, and a drawing instrument adjustably mounted on said arm.

PAUL H. DIXON.